(12) United States Patent
Peng et al.

(10) Patent No.: US 12,143,348 B2
(45) Date of Patent: Nov. 12, 2024

(54) INFORMATION DISPLAY METHOD AND APPARATUS, AND ELECTRONIC DEVICE

(71) Applicant: BEIJING ZITIAO NETWORK TECHNOLOGY CO., LTD., Beijing (CN)

(72) Inventors: Zhaoyuan Peng, Beijing (CN); Lei Zhang, Beijing (CN); Yichen Li, Beijing (CN); Bowen Shen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/361,076

(22) Filed: Jul. 28, 2023

(65) Prior Publication Data

US 2023/0370399 A1 Nov. 16, 2023

Related U.S. Application Data

(63) Continuation of application No. PCT/CN2022/074926, filed on Jan. 29, 2022.

(30) Foreign Application Priority Data

Jan. 29, 2021 (CN) .......................... 202110133443.8
Mar. 9, 2021 (CN) .......................... 202110262482.8

(51) Int. Cl.
*H04W 4/00* (2018.01)
*G06F 3/0481* (2022.01)
(Continued)

(52) U.S. Cl.
CPC ............ *H04L 51/04* (2013.01); *G06F 3/0481* (2013.01); *G06F 3/04842* (2013.01); *H04L 51/21* (2022.05)

(58) Field of Classification Search
CPC ........ H04L 51/04; H04L 51/21; G06F 3/0481
See application file for complete search history.

(56) References Cited

U.S. PATENT DOCUMENTS

2014/0143230 A1* 5/2014 Scherpa .................. H04L 51/04
707/E17.014
2017/0322693 A1 11/2017 Zhang

FOREIGN PATENT DOCUMENTS

CN 105468695 A 4/2016
CN 105991394 A 10/2016
(Continued)

OTHER PUBLICATIONS

International Search Report (with English translation) and Written Opinion issued in PCT/CN2022/074926, dated Apr. 15, 2022, 8 pages provided.

(Continued)

*Primary Examiner* — Omoniyi Obayanju
(74) *Attorney, Agent, or Firm* — HSML P.C.

(57) ABSTRACT

An information display method and apparatus, and an electronic device are provided. The method includes: receiving an instruction for displaying a page for instant messaging; displaying, in response to the instruction, a display page for the instant messaging, where the display page includes a first display area and a second display area; and displaying contact information in the first display area and displaying filtered information in the second display area, where the contact information includes an identifier of at least one contact and interaction information with the contact, the filtered information includes a filter identifier and information of a message corresponding to the filter identifier; and a message corresponding to a filter identifier is obtained by performing filtering on messages to at least one contact under a preset filtering condition corresponding to the filter identifier.

25 Claims, 4 Drawing Sheets

(51) Int. Cl.
*G06F 3/04842* (2022.01)
*H04L 51/04* (2022.01)
*H04L 51/21* (2022.01)

(56) References Cited

FOREIGN PATENT DOCUMENTS

| | | |
|---|---|---|
| CN | 106411699 A | 2/2017 |
| CN | 109039862 A | 12/2018 |
| CN | 109725975 A | 5/2019 |
| CN | 111124211 A | 5/2020 |
| CN | 111399709 A | 7/2020 |
| CN | 111414534 A | 7/2020 |
| CN | 111666009 A | 9/2020 |
| IN | 201718029026 A | 8/2018 |
| WO | 2016/180260 A1 | 11/2016 |

OTHER PUBLICATIONS

"How to filter chat history?—Yaxiang Micro Marketing China's best retail O2O platform", available online at: www.iwxwx.com/index.php?m=Index&a=newsdetail&news_id=161, 9 pages, Mar. 27, 2015.
Office Action issued in Chinese Patent Application No. 202110262482.8, Aug. 1, 2023 (16 pages).
Notice of Grant issued in Chinese Patent Application No. 202110262482.8, Jan. 4, 2024 (5 pages).

\* cited by examiner

INFORMATION DISPLAY METHOD AND APPARATUS, AND ELECTRONIC DEVICE

CROSS REFERENCE OF RELATED APPLICATION

The present application is a continuation of International Patent Application No. PCT/CN2022/074926 filed on Jan. 29, 2022, which claims priority to Chinese Patent Application No. 202110133443.8, titled "INFORMATION DISPLAY METHOD AND APPARATUS, AND ELECTRONIC DEVICE", filed on Jan. 29, 2021, and Chinese Patent Application No. 202110262482.8, titled "INFORMATION DISPLAY METHOD AND APPARATUS, AND ELECTRONIC DEVICE", filed on Mar. 9, 2021 with the China National Intellectual Property Administration, all of which are incorporated herein by reference in their entireties.

FIELD

The present disclosure relates to the field of internet technology, and in particular to a method and an apparatus for displaying information, an electronic device.

BACKGROUND

With the development of internet technology, an instant information interaction between users is performed by using terminal devices. With the instant information interaction, users can transmit text, files, images, and the like, to each other in real time over a network.

A user may use an application client supporting instant messaging to perform the real-time information interaction with other users. Generally, in the application client supporting instant messaging, interactive information exchanged with other users is sorted in an order of receiving time.

SUMMARY

This summary is provided to introduce concepts in a simplified form. These concepts are described in detail in the following detailed description. This summary is not intended to identify key features or essential features of the claimed technical solution, and is not intended to limit the scope of the claimed technical solution.

A method and an apparatus for displaying information, an electronic device are provided according to embodiments of the present disclosure.

In a first aspect, a method for displaying information is provided in an embodiment of the present disclosure. The method includes: receiving an instruction for displaying a page for instant messaging; displaying, in response to the instruction, a display page for the instant messaging, where the display page includes a first display area and a second display area; and displaying contact information in the first display area and displaying filtered information in the second display area. The contact information includes an identifier of at least one contact (that may include a single chat object with a single user as an object for information exchange or group chat objects with multiple users as objects for information exchange) and interaction information with the contact. The filtered information includes a filter identifier and information of a message corresponding to the filter identifier, such as a to-be-processed message. A message corresponding to a filter identifier is obtained by performing filtering on messages to at least one contact under a preset filtering condition corresponding to the filter identifier In a second aspect, an apparatus for displaying information is provided in an embodiment of the present disclosure. The apparatus includes: a first receiving unit, configured to receive an instruction for displaying a page for instant messaging; a display unit, configured to display, in response to the instruction, a display page for the instant messaging. The display page includes a first display area and a second display area. Contact information is displayed in the first display area, and filtered information is displayed in the second display area. The contact information includes an identifier of at least one contact and interaction information with the contact. The filtered information includes a filter identifier and information of a to-be-processed message in messages corresponding to the filter identifier, such as a to-be-processed message. A message corresponding to a filter identifier is obtained by performing filtering on messages to at least one contact under a preset filtering condition corresponding to the filter identifier.

In a third aspect, an electronic device is provided in an embodiment of the present disclosure. The electronic device includes: one or more processors; and a storage device storing one or more programs. The one or more programs, when executed by the one or more processors, cause the one or more processors to implement the method for displaying information as in the first aspect.

In a fourth aspect, a computer-readable medium is provided in an embodiment of the present disclosure. The computer-readable medium stores a computer program. The program, when executed by a processor, causes the processor to implement the method for displaying information as in the first aspect.

With the method and the apparatus for displaying information, and the electronic device according to the embodiments of the present disclosure, an instruction for displaying a page for instant messaging is received; a display page for the instant messaging is displayed in response to the instruction, where the display page includes a first display area and a second display area; and contact information is displayed in the first display area and filtered information is displayed in the second display area, where the contact information includes an identifier of at least one contact and interaction information with the contact, the filtered information includes a filter identifier and information of a message corresponding to the filter identifier, and a message corresponding to a filter identifier is obtained by performing filtering on messages to at least one contact under a preset filtering condition corresponding to the filter identifier. Therefore, information pass-through of displaying filter identifiers and messages corresponding to the filter identifiers in the display page is realized. In a conventional technology, messages are sorted simply in a chronological order, or sorted in a chronological order within a contact. In the method provided in the embodiment, filtered information is displayed on the display page. A user can view messages in a way of an information flow, and can view a message corresponding to a filter identifier based on the filter identifier. The user can search and browse related messages through the filter identifier. Thereby, a speed of viewing interested messages for the user is improved, and user experience is improved. In addition, on the display page, information of a to-be-processed message corresponding to a filter identifier is displayed, allowing the user to know, in real time, whether there is a to-be-processed message corresponding to a filter identifier that the user is interested in.

therefore, it is convenient for the user to select an important to-be-processed message from multiple to-be-processed messages for processing, and thus timeliness of processing of a message by the user is improved.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

DETAILED DESCRIPTION

Figure 1:
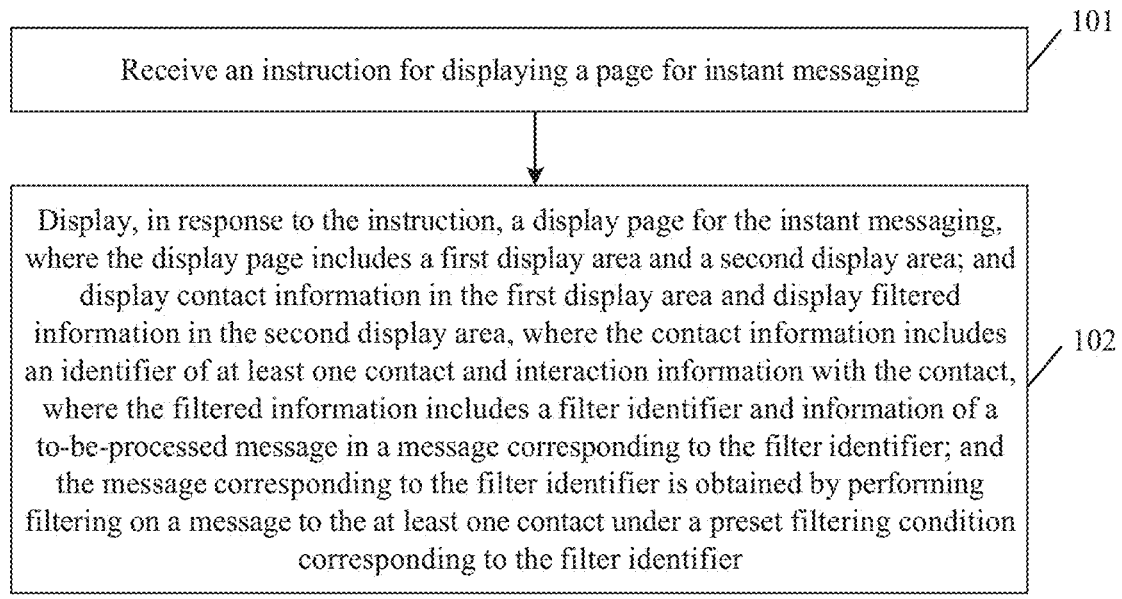
FIG. 1 is a flowchart of a method for displaying information according to an embodiment of the present disclosure.

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, these examples are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments." Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative rather than restrictive. Those skilled in the art should understand that, unless the context clearly indicates otherwise, such determiners should be understood as "one or more".

The names of messages or information exchanged between multiple devices in the embodiments of the present disclosure are used for illustrative purposes only, and are not used to limit the scope of these messages or information.

Reference is made to FIG. 1, which is a flowchart of a method for displaying information according to an embodiment of the present disclosure. As shown in FIG. 1, the method for displaying information includes the following steps 101 to 102.

In step 101, an instruction for displaying a page for instant messaging is received.

A user may interact with another user by using an application client supporting instant messaging installed on a terminal device.

The terminal device may be a mobile terminal, or a fixed terminals such as a computer.

In some application scenarios, the instruction for displaying a page for instant messaging may include an instruction issued by the user performing a selection operation on an identifier of the application client displayed on the terminal device.

In other application scenarios, in addition to the instant messaging function, the application client further integrates other functions, such as a calendar function. In these application scenarios, the instruction for displaying a page for instant messaging further includes an instruction issued by the user performing a switching operation in the application client for switching from another function to the instant messaging function.

In step 102, a display page for the instant messaging is displayed in response to the instruction, where the display page includes a first display area and a second display area; contact information is displayed in the first display area, and filtered information is displayed in the second display area. The contact information includes an identifier of at least one contact and interaction information with the contact.

In other words, the display page for the instant messaging is displayed in response to the instruction. The display page includes the first display area and the second display area. The contact information is displayed in the first display area. The contact information includes an identifier of at least one contact and the interaction information with the contact. The filtered information is displayed in the second display area. The filtered information includes a filter identifier and information of a to-be-processed message in a message corresponding to the filter identifier. The message corresponding to the filter identifier is obtained by performing filtering on messages to at least one contact under a preset filtering condition corresponding to the filter identifier.

In an embodiment, the first display area and the second display area may be arranged in a preset manner on the display page. In some application scenarios, the first display area and the second display area are arranged in a upper-lower arrangement. In other application scenarios, the first display area and the second display area are arranged in a left-right arrangement.

Shapes of the first display area and the second display area may be rectangular or other shapes. The first display area and the second display area may have a same shape.

As an implementation, the first display area and the second display area may have a same width.

Here, the first display area may be for displaying an information flow.

The contact may include a single chat object with a single user as an object for information exchange, or group chat objects with multiple users as objects for information exchange.

In some application scenarios, the interaction information with the contact may be a last information with the contact.

The filter identifier may include a text, a symbol, a letter, and/or a number.

The information of a to-be-processed message may include quantity information and/or identification information for indicating existence of the to-be-processed message.

The identification information for indicating existence of the to-be-processed message, for example, may include a symbol, a text, and a graphic. In some application scenarios, the identification information for indicating existence of the to-be-processed message may further have a preset color.

In some alternative implementations, the filter identifier includes at least one or a combination of two or more of the following: at least one first filter identifier, corresponding to a preset filtering condition that includes filtering messages based on a preset attribute type of the messages; at least one second filter identifier, corresponding to a preset filtering condition that includes filtering messages based on state information of the messages; and at least one third filter identifier, corresponding to a preset filtering condition that is determined based on a user filtering condition set by a user.

The preset attribute type may include, but is not limited to: a single chat, a group chat, a shared document, and a confidential session. The preset attribute type is a fixed attribute of a message. An attribute type of a message may be determined after the message is sent from one party to another. For example, user A sends a message a to user B, and when the message a is sent, a preset attribute type of the message a is determined as single chat; in a case that the user A sends a shared document b to the user B, the preset attribute type of the message is determined as the shared document type; and in a case that the user A sends a message c to a group chat object, the preset attribute type of the message c is determined as a group chat.

The first filter identifier includes at least one of first filter identifiers indicating a single chat, a group chat, a shared document, an information service, problem feedback, a confidential session, and a topic discussion square, respectively. The information service may be a subscribed message push service, for example. The problem feedback may be a communication tool specifically for feedback a problem, such as a communication group, for example. The topic discussion square may be a virtual community for indicating messages discussing topics, for example.

The state information may include, but is not limited to, unread state information and information directed to a target user.

The message corresponding to the filter identifier includes a new message corresponding to the filter identifier. In an application scenario, the new message corresponding to the filter identifier is obtained by performing real-time filtering on new messages to at least one contact under a preset filtering condition corresponding to the filter identifier.

As an implementation, the application client may determine a filter identifier corresponding to a new message after each reception of the new message.

As another implementation, the application client may determine, every other preset time period, a filter identifier corresponding to a new message received during a preset time period.

As another implementation, the application client may determine filter identifiers corresponding to a certain quantity of new messages on each reception of the certain quantity of new messages.

In these application scenarios, the filter identifier of a new message is obtained in real time, and is reflected through information of a to-be-processed message corresponding to the filter identifier. Therefore, a user can timely know a change in the information of the to-be-processed message corresponding to the filter identifier.

In some optional implementations, before displaying filtered information in the second display area, the method for displaying information further includes the following sub-steps 1021 to 1023.

In sub-step 1021, it is determined whether a to-be-processed message not associated with the filter identifier exists.

The to-be-processed messages may be a newly received message or a message that is previously received an is waiting to be processed.

In sub-step 1022, the to-be-processed message is filtered based on preset filter conditions corresponding to multiple filter identifiers, on determining that the to-be-processed message not associated with the filter identifier exists, and a target filter identifier corresponding to the to-be-processed message is determined based on a filtering result.

Optionally, a quantity of the target filter identifier is determined based on the filtering result.

In an example, for each to-be-processed message that is not associated with a filter identifier, a preset filtering conditions corresponding to filter identifiers may be applied to filter the to-be-processed message. In a case that a to-be-processed message matches the filtering condition corresponding to a filter identifier, the filter identifier may be determined as a target filter identifier for the to-be-processed message. In a case that a to-be-processed message matches a filtering condition corresponding to another filter identifier, the another filter identifier may be determined as another target filter identifier for the to-be-processed message.

Optionally, the sub-step 1022 may include: determining, based on a preset attribute type of the to-be-processed message, a target first filter identifier corresponding to the to-be-processed message; and determining, based on state information corresponding to the to-be-processed message, a target second filter identifier corresponding to the to-be-processed message.

The state information includes state information directed to the target user. The target user may be a user who log in to the application client, for example. The message directed to the target user may be a message directed to the target user in a message for a group chat object. Typically, the message directed to the target user may include a preset directional symbol and an identifier of the target user. The state information of the message may be determined by identifying whether the message includes the preset directional symbol and the identifier of the target user.

In optional implementations, a target first filter identifier and a target second filter identifier corresponding to a to-be-processed message may be determined synchronously, or the target first filter identifier and the target second filter identifier corresponding to the to-be-processed message may be determined step by step.

In some optional implementations, the second filter identifier includes an unread filter identifier. A process of determining, based on state information corresponding to the to-be-processed message, a target second filter identifier corresponding to the to-be-processed message may include:

determining that the target second filter identifier corresponding to the to-be-processed message is an unread state filter identifier, on determining that the state information of the to-be-processed message is unread state information.

In the optional implementations, the to-be-processed messages having the unread state information may be associated with the unread filter identifier.

In sub-step 1023, the to-be-processed message is associated with the target filter identifier.

In some application scenarios, messages may be collectively stored in a message array. A storage unit in the message array may store a message and a processing state corresponding to the message. The processing state may include a processed state and a to-be-processed state.

As an implementation, the target filter identifier may be written in the storage unit of a message to indicate that the message is associated with the target filtering identifier.

As another implementation, for each target filter identifier, a data storage area corresponding to the target filter identifier may be established. All messages having an association with the filter identifier may be stored in the data storage area. In this implementation, the to-be-processed message is associated with the target filter identifier, which means that the to-be-processed message is added to a data storage area corresponding to the target filter identifier.

As another implementation, for each target filter identifier, a data storage area corresponding to the target filter identifier may be established. A message identifier corresponding to the to-be-processed message or a link to obtain the message may be stored in the data storage area corresponding to the target filter identifier.

In some optional implementations, the second display area and the first display area are arranged in a second direction. The second display area includes multiple sub-areas arranged sequentially along a first direction. Each of the sub-areas is for displaying filtered information corresponding to one filter identifier. The first direction is perpendicular to the second direction. A width in the first direction of each sub-area corresponding to the filtered information is positively correlated with a space occupied by information of a to-be-processed message corresponding to the filtered information.

In some application scenarios, the second display area and the first display area are arranged in an upper-lower relationship. The first display area and the second display area have a same width in the first direction. In these application scenarios, the sub-areas are arranged from left to right.

In some application scenarios, the information of the to-be-processed message includes quantity information. In these application scenarios, that a width in the first direction of each sub-area corresponding to filtered information is positively correlated with a space occupied by information of a to-be-processed message corresponding to the filtered information includes that: a width in the first direction of each sub-area corresponding to the filtered information is positively correlated with bits of a quantity represented by the quantity information of the to-be-processed message corresponding to the filtered information.

On reception of a new message, a filter identifier corresponding to the new message is determined in real time, and the information of the to-be-processed message corresponding to the filter identifier is updated in real time based on the reception of the new message.

In the optional implementations, the received new message may be associated in real time with a corresponding target filter identifier. A width of a sub-area corresponding to one piece of filtered information in the first direction changes dynamically with bits of a quantity in the quantity information.

The width of the sub-area in the first direction is set to be positively correlated with the space occupied by the filtered information. Therefore, each filtered information can be displayed completely and clearly in the sub-area, which is beneficial for a user to browse, and can save display space to the maximum extent, so as to display as much information as possible within a limited display space.

In some optional implementations, the method for displaying information further includes the following steps 103.

In step 103 (not shown in the figure), filtered information not displayed currently is displayed in a display manner corresponding to a first display operation for displaying filtered information not displayed currently, on reception of the first display operation performed in the second display area.

In the optional implementations, at least one filtered information is not displayed in the second area.

In some application scenarios, a non-displayed-information identifier indicating existence of filtered information not displayed currently may be displayed in the second display area. In these application scenarios, the step 103 includes: displaying, in a display window above a window of the display page, the filtered information not displayed, on reception of a selection operation on the non-displayed-information identifier, where the display window above the window of the display page includes a pop-up window and a floating window.

In these application scenarios, the terminal devices may be desktop computers, laptops, or mobile terminals.

Optionally, in the display window above the display page, at least one filtered information not displayed is displayed in a form of a list.

In these application scenarios, by performing the selection operation, such as a click, on the non-displayed-information identifier, the filtered information not displayed is displayed in the display window above the display page, allowing the user to be aware of the filtered information that is not displayed in the second display area.

In other application scenarios, the first display area and the second display area are arranged in a second direction. Multiple sub-areas for displaying filtered information are arranged sequentially in a first direction within the second display area. The first direction is perpendicular to the second direction. The step 103 includes: displaying, in the second display area after extended through an expansion operation, at least one filtered information not displayed currently, on reception of the expansion operation for expanding the display page along the first direction or an opposite direction of the first direction.

In these application scenarios, a user may perform a dragging operation along the first direction on a boundary that extends along the second direction on the display page. A width of a display area on the display page can be expanded through the dragging operation. In addition, the user may perform a dragging operation along an opposite direction of the first direction on another boundary that extends along the second direction on the display page, which can also expand the width of the display area on the display page.

With the expansion operation on the display page, the filtered information that is not currently displayed can be browsed quickly.

In some optional implementations, the first display area and the second display area are arranged in a second direction. Multiple sub-areas for displaying filtered information are arranged sequentially in a first direction within the second display area. The first direction is perpendicular to the second direction. The step 103 includes: sliding sub-areas corresponding to multiple filtered information along an opposite direction of the first direction, on reception of a sliding operation by a user along the opposite direction of the first direction within the second display area, to display at least one filtered information not displayed currently; or sliding sub-areas corresponding to multiple filtered information along the first direction, on reception of a sliding operation by a user along the first direction within the second display area, to display at least one filtered information not displayed currently.

In the optional implementations, at least one filtered message not displayed currently can be displayed by performing a sliding operation on the second display area along the first direction or the opposite direction of the first direction on a screen. Thereby, the user can browse various filtering messages quickly.

Figure 2:
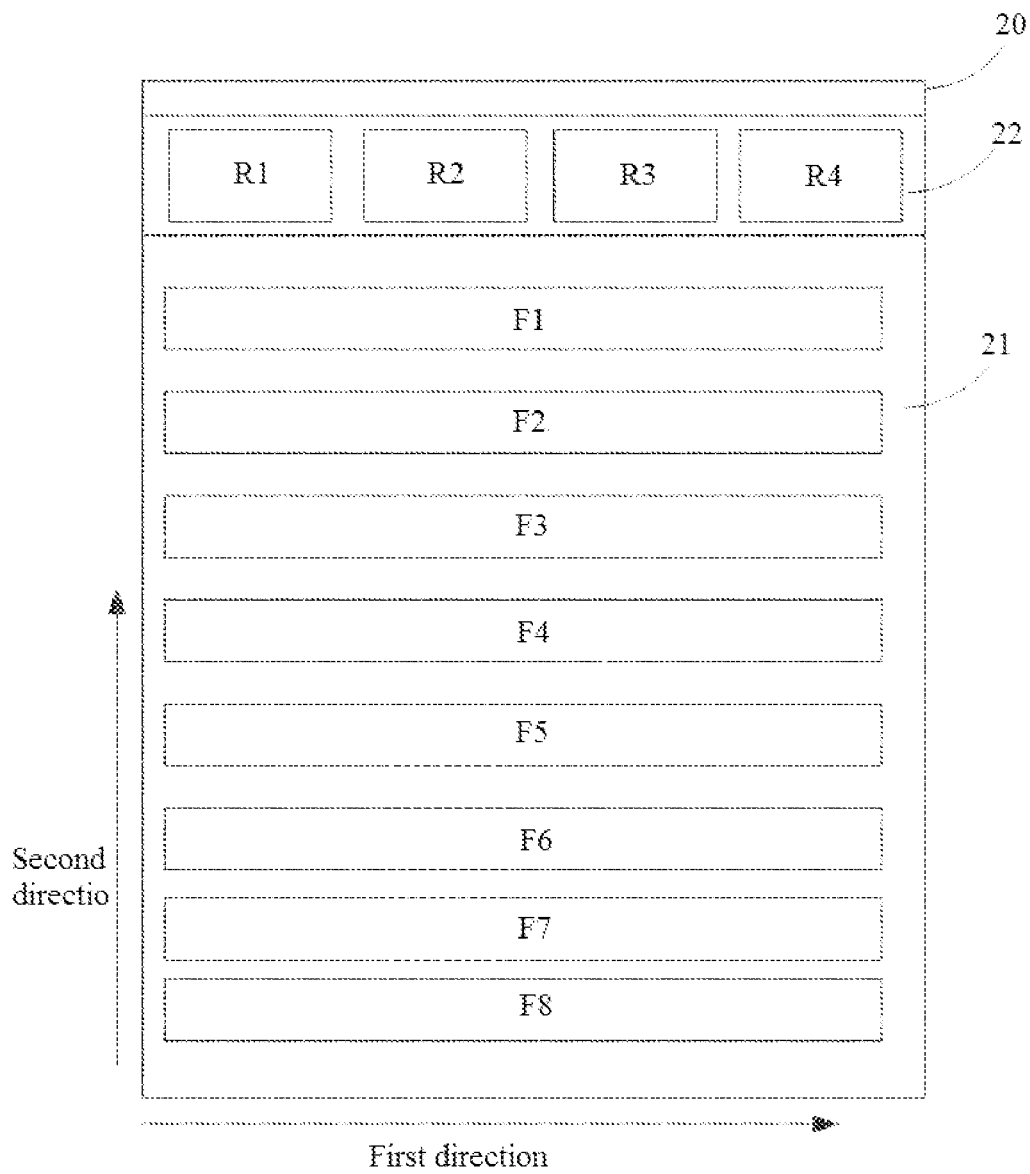
FIG. 2 is a schematic diagram of an application scenario of the method for displaying information according to an embodiment of the present disclosure.

Reference is made to FIG. 2, which shows a schematic diagram of an application scenario of a method for displaying information according to an embodiment of the present disclosure. As shown in FIG. 2, a display page 20 for instant messaging includes a first display area 21 and a second display area 22.

The first display area 21 may display an information flow, such as an information flow including information F1, F2, F3, F4, F5, and the like. The second display area 22 may display filtered information, such as R1, R2, R3, and R4. The R1, R2, R3, and R4 are only for schematic explanations. Similarly, the F1, F2, F3, F4, and F5 in the figure are only for schematic explanations.

In FIG. 2, the first display area 21 and the second display area 22 are arranged in the second direction. The first direction is perpendicular to the second direction. A sliding operation along the first direction may be performed in the second display area to display the filtered information not displayed currently, for example, to display filtered information that is not displayed currently and is close to the filtered information R1.

In the method for displaying information, and the electronic device according to the embodiments of the present disclosure, an instruction for displaying a page for instant messaging is received; a display page for the instant messaging is displayed in response to the instruction, where the display page includes a first display area and a second display area; and contact information is displayed in the first display area and filtered information is displayed in the second display area, where the contact information includes an identifier of at least one contact and interaction information with the contact, the filtered information includes a filter identifier and information of a message corresponding to the filter identifier, and a message corresponding to a filter identifier is obtained by performing filtering on messages to at least one contact under a preset filtering condition corresponding to the filter identifier. Therefore, information pass-through of displaying filter identifiers and messages corresponding to the filter identifiers in the display page is realized. In a conventional technology, messages are sorted simply in a chronological order, or sorted in a chronological order within a contact. In the method provided in the embodiment, filtered information is displayed on the display page.

A user can view messages in a way of an information flow, and can view a message corresponding to a filter identifier based on the filter identifier. The user can search and browse related messages through the filter identifier. Thereby, a speed of viewing interested messages for the user is improved, and user experience is improved. In addition, on the display page, information of a to-be-processed message corresponding to a filter identifier is displayed, allowing the user to know, in real time, whether there is a to-be-processed message corresponding to a filter identifier that the user is interested in. therefore, it is convenient for the user to select an important to-be-processed message from multiple to-be-processed messages for processing, and thus timeliness of processing of a message by the user is improved.

Figure 3:
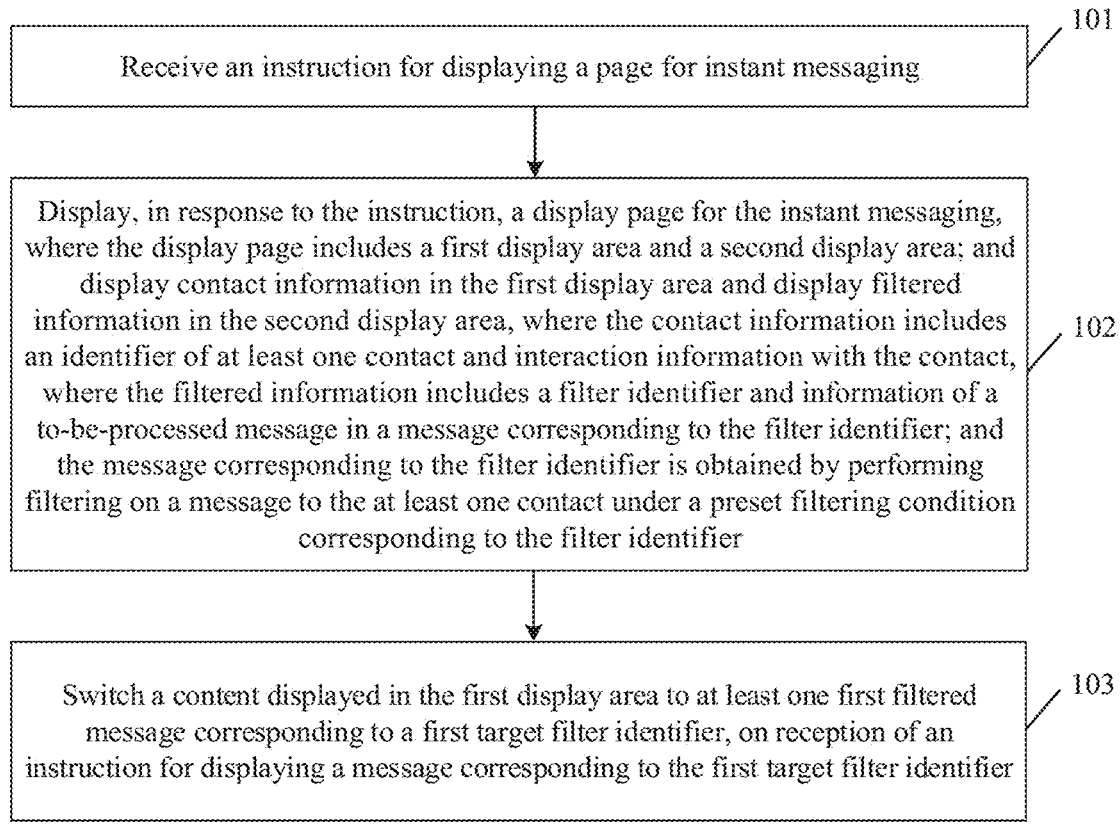
FIG. 3 is a flowchart of a method for displaying information according to another embodiment of the present disclosure.

Reference is further made to FIG. 3, which illustrates a flow of a method for displaying information according to another embodiment of the present disclosure. As shown in FIG. 3, the method for displaying information includes the following steps 301 to 303.

In step 301, an instruction for displaying a page for instant messaging is received.

In step 302, a display page for the instant messaging is displayed in response to the instruction, where the display page includes a first display area and a second display area; contact information is displayed in the first display area, and filtered information is displayed in the second display area. The contact information includes an identifier of at least one contact and interaction information with the contact. In other words, the display page for the instant messaging is displayed in response to the instruction. The display page includes the first display area and the second display area. The contact information is displayed in the first display area. The contact information includes an identifier of at least one contact and the interaction information with the contact. The filtered information is displayed in the second display area. The filtered information includes a filter identifier and information of a to-be-processed message in a message corresponding to the filter identifier. The message corresponding to the filter identifier is obtained by performing filtering on messages to at least one contact under a preset filtering condition corresponding to the filter identifier.

In step 303, content displayed in the first display area is switched to at least one first filtered message corresponding to a first target filter identifier, on reception of an instruction for displaying a message corresponding to the first target filter identifier.

A user may select one of multiple filter identifiers displayed in the second display area as the first target filter identifier.

In some optional implementations, the first target filter identifier may be selected by clicking, touching, and other selection operations.

After the first target filter identifier is selected through the above method, a subject executing the method for displaying information may display, in the first display area, at least one first filtered message corresponding to the first target filter identifier, based on an association relationship between a message and a filter identifier.

In an example, in the first display area, the at least one of the first filtered messages is divided into at least one group, and each group corresponds to a contact. A group may include at least one first filtered message.

Grouping the first filtered message by contacts allows the user to further select and browse an important first filtered message based on the contact from the first filtered message corresponding to the filter identifier.

In some optional implementations, the method for displaying information further includes step 304 (not shown in the figure): switching the content displayed in the first display area to a second filtered message corresponding to a second target filter identifier indicated in a first switching operation for switching a filter identifier, on reception of the first switching operation while displaying a first filtered message corresponding to the first target filter identifier.

In the optional implementations, the first switching operation includes: a selection operation on the second target filter identifier, or a sliding operation along a first direction on the first display area displaying a first filtered message, or a sliding operation along an opposite direction of the first direction on the first display area displaying a first filtered message. The first direction is perpendicular to a direction along which the first display area and the second display area are arranged.

In the optional implementations, by performing the switching operation on the filter identifier, the filtered information corresponding to the filter identifier after switching is displayed in the first display area. Therefore, the speed of displaying the message switched to can be improved.

In some optional implementations, the first filtered message includes multiple first filtered messages; and the step 304 further includes recording an identifier of a last one of the first filtered messages displayed in the first display area at a time of the first switching operation, before displaying the second filtered information corresponding to the second target filter identifier indicated in the first switching operation.

Optionally, the method for displaying information further includes: determining, based on the recorded identifier, a target first filtered message displayed in the first display area, on reception of a second switching operation for switching back to the first target filter identifier; and displaying, in the first display area, the target first filtered message.

Further, the determining, based on the recorded identifier, a target first filtered message displayed in the first display area, on reception of a second switching operation for switching back to the first target filter identifier includes: determining multiple target first filtered information displayed in the first display area, by taking a first filtered message corresponding to the identifier as a first piece of the target first filtered information.

In the optional implementations, when switching between selected filter identifiers, the identifier of the last filtered message displayed corresponding to the first target filter identifier before switching is recorded. After switching back from displaying other content to the first target filter ID, the last filtered message and other filtered information close to the last filtered message may be displayed. Therefore, it is ensure that the filtered information viewed by the user remains consistent before and after the switching.

In some optional implementations, the method for displaying information further includes step 305 (not shown in the figure): updating information of a to-be-processed message corresponding to a filter identifier, based on an increase or decrease of the to-be-processed message corresponding to the filter identifier.

In some application scenarios, the step 305 includes the following sub-steps.

Firstly, a processing quantity of to-be-processed messages processed this time is determined, on detection of processing on at least one of the to-be-processed messages corresponding to the first target filter identifier.

Then, information of the to-be-processed message corresponding to the first target filter identifier is updated based on the processing quantity, and information of a to-be-processed message corresponding to another filter identifier associated with the processed to-be-processed messages is updated synchronously.

Optionally, the to-be-processed message may be a message to be replied to, and the processing on the to-be-processed message may be replying to the to-be-processed message.

Optionally, the to-be-processed messages may be a message to be viewed, and the processing on the to-be-processed messages may be viewing the to-be-processed message.

That is, when a to-be-processed message is processed on a message display page corresponding to any filter identifier, the information of another to-be-processed message of another filter identifier associated with the to-be-processed message is updated synchronously.

As a schematic illustration, in a case that a to-be-processed message d1 is processed when the filtered message of a filter identifier s1 is displayed, information of a to-be-processed message of the filter identifier s1 is updated. In addition, information of to-be-processed messages corresponding to other filter identifiers s2 and s3 associated with the to-be-processed message d1 is updated. In a case that the information of the to-be-processed message is quantity information, in the above schematic description, quantities corresponding to the filter identifier s1 and the filter identifiers s2 and s3 are reduced by 1 synchronously.

In other application scenarios, the step 305 includes the following sub-steps.

Firstly, it is determined whether a new message corresponding to the first target filter identifier is displayed in the first display area, on reception of the new message while displaying the at least one first filtered message corresponding to the first target filter identifier.

Then, quantity information corresponding to the second target filter identifier is updated, on determining that the new message is not displayed in the first display area, and information of a to-be-processed message corresponding to another filter identifier associated with the new message is updated synchronously.

In the application scenarios, in a case that a newly received message is not displayed on a current interface when displaying the message corresponding to the first target filter identifier, the newly received message may be updated in the information of the to-be-processed message corresponding to the first target filter identifier. Simultaneously, the information of the to-be-processed message corresponding to another filter identifier associated with the new message is updated synchronously. For example, a quantity of to-be-processed messages corresponding to multiple filter identifiers associated with the new message is increased by 1.

Compared with the embodiment as shown in FIG. 1, this embodiment highlights the step of displaying, in the first display area, the filtered message corresponding to the filter identifier based on the selection of the filter identifier. By displaying the content of the first display area in real time based on the selected filter identifier, the filtered information corresponding to the filter identifier can be displayed in the display interface in real time. Compared with displaying filtered information on a floating window page or other display pages, the method provided in this embodiment can reduce the switching operation by the user on the content displayed in the first display area.

In addition, this embodiment further highlights the step of updating the information of the to-be-processed message corresponding to the filter identifier based on the increase or decrease of the filtered information. The user can quickly know the increase or decrease of the filtered information based on the information of the to-be-processed message corresponding to the filter identifier. In addition, resource waste caused by the user processing the same filtered information in different filter identifiers can be avoided.

In some optional implementations of this embodiment, the method for displaying information further includes: clearing the target to-be-processed message from a to-be-processed message corresponding to the first target filter identifier, on detection of processing on the target to-be-processed message corresponding to the first target filter identifier. In some embodiments, it is also possible to cease display of the target to-be-processed message in the first display area. In the optional implementations, the state information includes unread state information and state information directed to the target user.

The target to-be-processed message here can be any to-be-processed message corresponding to the first target filter identifier. The target to-be-processed message here may be one message or more than two messages.

Whether the target to-be-processed message is processed may be detected in real time. In some application scenarios, a subject executing the method may be a terminal device having an instant messaging application running thereon. Taking an example in which the processing operation on the to-be-processed message corresponding to the first target filter identifier is a viewing operation, the subject may detect, in real time, whether the user has viewed the target to-be-processed message. For example, it is determined whether the target to-be-processed message displayed on the current page is moved to a preset area, including but is not limited to being moved to a top of the current page, being moved to a display area, and being moved out of the display area through the display area. In a case that the target to-be-processed message is moved to the preset area, it is determined that the target to-be-processed message is processed. In a case that it is detected that the to-be-processed message is processed by the user, display of the target to-be-processed message on the current page may be ceased, and the target to-be-processed message may be cleared from the to-be-processed message corresponding to the first target filter identifier.

Optionally, the first target filter identifier is a second filter identifier corresponding to a preset filtering condition that includes filtering based on state information of a message. The state information includes unread state information and information directed to the target user. A message corresponding to the second filter identifier is filtered from messages corresponding to other filter identifiers based on the state information. That is, information corresponding to the second filter identifier overlaps with the information of other filter identifiers.

With the above optional solution, the to-be-processed messages corresponding to the second filter identifier that is processed can be cleared in time. Therefore, storing of too much redundant information in the terminal device can be avoided.

In some optional implementations of this embodiment, the method for displaying information display further includes: ceasing, based on a preset information switching operation, display of the target to-be-processed message in the first display area corresponding to the first target filter identifier, on detection of processing on the target to-be-processed message corresponding to the first target filter identifier. In some embodiments, the target to-be-processed message may be further cleared from the to-be-processed message corresponding to the first target filter identifier based on a preset information switching operation.

In these optional implementation methods, the state information includes unread state information and information directed to the target user.

The target to-be-processed message here may be any to-be-processed message corresponding to the first target filter identifier. The target to-be-processed message here may be one message or more than two messages.

Whether the target to-be-processed message is processed may be detected in real time. In some application scenarios, a subject executing the method may be a terminal device having an instant messaging application running thereon. Taking an example in which the processing operation on the to-be-processed message corresponding to the first target filter identifier is a viewing operation, the subject may detect, in real time, whether the user has viewed the target to-be-processed message. For example, it is determined whether the target to-be-processed message displayed on the current page is moved to a preset area, including but is not limited to being moved to a top of the current page, being moved to a display area, and being moved out of the display area through the display area. In a case that the target to-be-processed message is moved to the preset area, it is determined that the target to-be-processed message is processed. The first target filter identifier is the second filter identifier, and the preset filtering condition corresponding to the second filter identifier includes filtering based on state information of the message.

In these optional implementation methods, the ceasing the display of the target to-be-processed message and/or the clearing the target to-be-processed message are not performed immediately on detection of processing on the target to-be-processed message is processed. After determining that the target to-be-processed message is processed, the target to-be-processed message may be then cleared and or ceased displaying based on a preset information switching operation. Thus, the target to-be-processed messages may be temporarily suspended, so that the user can view the target to-be-processed message again under the second filter identifier in a case that the user needs to refer to the target to-be-processed message when processing other messages. Thereby, user experience can be improved.

Furthermore, the preset information switching operation includes one of the following: switching from displaying a message corresponding to the first target filter identifier to displaying a message corresponding to another filter identifier; or switching from displaying a message corresponding to another filter identifier to displaying a message corresponding to the first target filter identifier.

In some application scenarios, the preset information switching operation may be switching from displaying a message corresponding to the first target filter identifier to displaying a message corresponding to another filter identifier. In these implementations, when the user switches display information to the information corresponding to another filter identifier the message corresponding to the first target filter identifier is displayed, it can be considered that the user no longer needs to refer to the target to-be-processed message, and thus the target to-be-processed messages may be cleared from the to-be-processed message corresponding to the first target filter identifier. As an implementation, in a case that there is a storage area in the terminal device for the to-be-processed message corresponding to the first target filter identifier, the target to-be-processed message may be deleted from the storage area. In some application scenarios, the target to-be-processed message is associated with the first target filter identifier in a message storage area in the terminal device. As another implementation, the association between the target to-be-processed message and the first target filter identifier may be removed. The terminal device may cease display of the target to-be-processed message based on a result of removing of the association relationship, after detection of the information switching operation.

In other application scenarios, the preset information switching operation includes switching from displaying a message corresponding to another filter identifier to displaying a message corresponding to the first target filter identifier. In these application scenarios, on detection of processing on the target to-be-processed message when the message corresponding to the first target filter identifier is displayed, in a case that the user switches the display information to a message corresponding to another filter identifier when the message corresponding to the first target filter identifier is displayed, the target to-be-processed message is not cleared from the to-be-processed message corresponding to the first target filter identifier. Instead, the target to-be-processed message is retained in the to-be-processed messages corresponding to the first target filter identifier. When the user performs a preset information switching operation for switching b from displaying a message corresponding to another filter identifier to displaying a message corresponding to the first target filter identifier, the display of the target to-be-processed message may be ceased in the first display area where the message corresponding to the first target filter identifier is displayed. Then, the target to-be-processed message is cleared from the to-be-processed message corresponding to the first target filter identifier. In this way, the target to-be-processed message can be temporarily retained in the first target filter identifier for the user to search for the target to-be-processed message.

Furthermore, in these application scenarios, a process of clearing, based on a preset information switching operation, the target to-be-processed message from a to-be-processed message corresponding to the first target filter identifier includes: determining whether a time period for displaying the message corresponding to the first target filter identifier after switching back to the message corresponding to the first target filter identifier is greater than a preset time threshold, on reception of the preset information switching operation; and clearing the target to-be-processed message from the to-be-processed message corresponding to the first target filter identifier, in a case of a positive determination result. Furthermore, the determining whether a time period for displaying the message corresponding to the first target filter identifier is greater than a preset time threshold includes determining whether a time period for displaying the target to-be-processed message is greater than the preset time threshold.

The preset time threshold may include, for example, 1 minute, 2 minutes, and the like. The preset time threshold may be set based on a specific application scenario, and is not limited here.

In the application scenarios, a time period of keeping a processed target to-be-processed message in the message corresponding to the first target filter identifier may be extended, so as to meet a demand of the user to refer to the target to-be-processed message when processing another message in the message corresponding to the first target filter identifier.

Optionally, the first target filter identifier is the second filter identifier corresponding to a preset filtering condition that includes filtering based on state information of a message. The first target filter identifier corresponds to a user list that includes multiple user identifiers, and the user identifiers include a group user identifier. The method for displaying information further includes: clearing the group user identifier from the user list after a to-be-processed message corresponding to the group user identifier is cleared, on reception of information that a group corresponding to the group user identifier is dissolved, or information that a user leaves a group corresponding to the group user identifier.

In these optional implementations, the target user may be a user who logs in to the instant messaging application on the terminal device. In some application scenarios, the target user may be a user who created the group user identifier corresponding to the group.

Users in a group may determine to leave the group. When a user determines to leave the group, the instant messaging application client corresponding to the user may determine whether there is a to-be-processed message corresponding to the group user identifier in the first target filter identifier in this client. If there is no such to-be-processed message, the group user identifier may be cleared from the first target filter identifier. If there is such to-be-processed message, the to-be-processed message may be cleared and then the group user identifier may be deleted.

In addition, a creator of the group or other users having authority to dissolve the group may dissolve the group. On detection of information of dissolution of a receiving group, the instant messaging application client used by users in the group may determine whether the to-be-processed message in the client is cleared. In a case that the to-be-processed message is cleared, the group user identifier may be cleared from the user list corresponding to the first target filter identifier in this client.

In these optional implementations, by clearing the group user identifier of the dissolved or exited group from the user list of the first target filter identifier (i.e., the second filter identifier), outdated information can be eliminated from the list of first target filter identifiers, so that user experience can be improved.

In some optional implementations, a user logs in the instant messaging application on at least two terminal devices using a same user account, and the method for displaying information further includes: synchronizing the information that the target to-be-processed message is cleared at the terminal devices to the other terminal device of the at least two terminal devices, in a case that one of the at least two terminal devices clears the target to-be-processed message, for the other terminal device to synchronously clear the target to-be-processed message.

In these optional implementations, the user logs in to an instant messaging application using multiple terminal devices and is viewing a message corresponding to the second filter identifier. In a case that the user processes the target to-be-processed message in one of the terminal devices and the terminal device clears the target to-be-processed message, the terminal device can synchronize information that the target to-be-processed message is cleared to the other of the at least two terminal devices. After receiving the information, the other terminal devices may clear the target to-be-processed messages from the to-be-processed message corresponding to the second filter identifier in the local instant messaging client.

By synchronizing the information that the target to-be-processed message is cleared between different terminal devices logged in to the instant messaging application client at a same time, a consistency of displayed information can be realized among the multiple devices. Therefore, an inconvenience caused to the user due to asynchronous display of information between different devices is reduced, and the user experience is improved.

In some optional implementations of this embodiment, step 303 of the method for displaying information as shown in FIG. 3 may further include: switching, in the first display area, a current display content to at least one to-be-processed message based on a preset switching rule of to-be-processed messages, on reception of a preset to-be-processed message display operation by a user on filtered information corresponding to the first target filter identifier. The at least one first filtered message includes the to-be-processed message.

The filtered information includes a first target filter identifier and information of the to-be-processed message.

The preset to-be-processed message display operation includes, but is not limited to, clicking, double clicking, multi-clicking, long pressing, single touch, double touch, multi-touch, or other operations performed on a sub-area corresponding to the filtered information.

Furthermore, the operations performed on the sub-area corresponding to the filtered information include: a preset operation performed on the first target filter identifier, or a preset operation performed on the information of the to-be-processed message corresponding to the first target filter identifier.

That is, the preset to-be-processed message display operation by a user on the filtered information corresponding to the first target filter identifier includes: a preset to-be-processed message display operation by a user on the first target filter identifier, or a preset to-be-processed message display operation by a user on information of a to-be-processed message corresponding to the first target filter identifier.

After the user performs the preset to-be-processed message display operation on the filtered information corresponding to the first target filter identifier, content displayed currently may be positioned to at least one to-be-processed message in the first display area. The at least one to-be-processed message may be determined based on the preset switching rule for to-be-processed message.

The preset switching rule for to-be-processed messages includes, but is not limited to: switching based on an order of message reception time; or switching based on user information of users sending a to-be-processed message.

In some application scenarios, the preset switching rule for to-be-processed messages is to switch based on an order of message reception time. In such application scenarios, after the user performs the preset to-be-processed message display operation, a to-be-processed message received at an earliest time instant is displayed in the first display area, based on a receiving time of each to-be-processed message. After the to-be-processed message received at an earliest time instant is processed, the to-be-processed message is either set as a processed message or cleared from the to-be-processed messages. When the preset to-be-processed message display operation executed by the user is received again, a to-be-processed message received at an earliest time may be determined from the to-be-processed messages and displayed.

In other application scenarios, the preset switching rule for to-be-processed messages is to switch based on user information of users sending a to-be-processed message. The user information may include, but is not limited to, a user identifier of a user who sent a to-be-processed message, and/or an association relationship between the user who sent a to-be-processed message and a target user.

In these application scenarios, after the user performs the preset to-be-processed message display operation, at least one to-be-processed message in the first display area may be determined based on the user identifier of the user who sent the to-be-processed message. Alternatively, at least one to-be-processed message displayed in the first display area may be determined based on the association relationship between the user who sent a to-be-processed message and the target user.

In some optional implementations of the method for displaying information, the first display and the second display area are arranged in a second direction. The method embodiment as shown in FIG. 1 and the method embodiment as shown in FIG. 3 may further include the following steps.

In the step, filtered information in the second display area displayed as fixed display information on the display page, on reception of a sliding operation on the display page along the second direction, where the second direction directs from the first display area towards the second display area.

In these optional implementations, the filtered information may be fixed and displayed on the above display page when sliding a displayed content on a current display page along the second direction, so as to avoid filtered information from sliding out of the display interface. The fixed area for displaying the above filtered information can be a preset area. The preset area mentioned above can be set at any position on the display interface.

When the user slides the displayed content, it means that the user may need to search for or view certain information. The filtered information is fixed and displayed in the display interface, making it convenient for the user to use the filtered information to search for or browse the information.

In some application scenarios, the second display area is displayed above the first display area, and the second direction directs from a bottom of a display page towards a top of the display page. The process of displaying filtered information in the second display area as fixed display information on the display page, on reception of a sliding operation on the display page along the second direction: displaying each filtered information as fixed display information at a top of the display page, on reception of the sliding operation on the display page along the second direction.

In these application scenarios, the filtered information may be fixed and displayed at the top of the displayed page, so that a user can use the filtered information for information viewing.

In some optional implementations of the embodiments of the method for displaying information, the first display area and second display area are arranged in a second direction. The method embodiment as shown in FIG. 1 and the method embodiment as shown in FIG. 3 may further include the following steps.

In the step, filtered information in the second display area is displayed as fixed display information on the display page, on reception of a sliding operation on the display page along a third direction, where the third direction directs from the second display area towards the first display area.

In a case that the first display area and the second display area are arranged in an upper-lower relationship, the third direction directs from a top of an upper display interface to a bottom of a lower display interface, that is, sliding downwards. When the sliding operation occurs, the filtered information may be displayed as fixed display information on the display page, so as to facilitate a user searching or viewing information by using the filtered information.

In some embodiments, a process of the method for displaying information includes the following steps. First, an instruction for displaying a page for instant messaging.

A relevant implementation of this step may refer to relevant parts of the step 101 in the embodiment shown in FIG. 1 and the step 301 in the embodiment shown in FIG. 3.

Then, a display page for the instant messaging is displayed in response to the instruction. The display page includes a first display area and a second display area. The first display area displays an information flow. The second display area displays filter identifiers.

A relevant implementation of this step may refer to relevant parts of step 102 in the embodiment shown in FIG. 1 and the step 302 in the embodiment shown in FIG. 3.

In this embodiment, more than one filter identifiers are displayed in the second display area.

Finally, a message corresponding to a first target filter identifier is displayed in the first display area, on reception of a selection operation on the first target filter identifier, where a message corresponding to a filter identifier is obtained by filtering multiple messages based on a filtering rule corresponding to the filter identifier.

The first target filter identifier may be one filter identifier selected from the more than one filter identifiers.

A process of displaying, in the first display area, a message corresponding to a first target filter identifier, on reception of a selection operation on the first target filter identifier includes: displaying, in the first display area, multiple messages corresponding to the first target filter identifier, on reception of the selection operation on the first target filter identifier; or displaying, in the first display area, a to-be-processed message corresponding to the first target filter identifier.

In some application scenarios, when the first target filter identifier is selected, multiple messages corresponding to the first target filter identifier may be displayed in the first display area. The multiple messages corresponding to the first target filter identifier may include a read message and an unread message.

In other application scenarios, when the first target filter identifier is selected, an unread message corresponding to the first target filter identifier may be displayed in the first display area.

In some embodiments, a to-be-processed message corresponding to the first target filter identifier is displayed in the first display area, and the method for displaying information further includes: ceasing display of a target to-be-processed message in the first display area corresponding to the first target filter identifier, based on a preset information switching operation, on detection of processing on the target to-be-processed message corresponding to the first target filter identifier.

In some embodiments, the preset information switching operation includes one of the following: switching from displaying a message corresponding to the first target filter identifier to displaying a message corresponding to another filter identifier; or switching from displaying a message corresponding to another filter identifier to displaying a message corresponding to the first target filter identifier.

In some optional implementations of the method according to the embodiments of the present disclosure, the method for displaying information further includes: displaying a filter identifier editing page, on reception of an instruction for editing a filter identifier, where the filter identifier editing page includes a first list, and the first list includes multiple selected filter identifiers; and moving a target filter identifier in the first list to a position indicated by a moving operation, on reception of the moving operation by a user on the target filter identifier, where the position is for indicating whether to display the target filter identifier in the second display area, or indicating a display position of the target filter identifier in the second display area.

In these optional implementation methods, a user may move a filter identifier through a simple movement operation such as dragging and dropping.

In addition, the filter identifier editing page further includes a second list. The second list may include at least one candidate filter identifier. The user may perform deletion operations in the first list. A candidate identifier from the second list may be added to the first list. A preset mapping rule is satisfied between an order of filter identifiers in the first list and an order of sub-areas of filter identifiers in the second display area. The preset mapping rule includes positional mapping.

Optionally, the method for displaying information further includes: adjusting an order of filter identifiers displayed in the second display area, based on an order of filter identifiers in the first list after an adjustment through the moving operation.

In these optional implementations, filter identifiers in the first list may be mapped to the second display area in the order of the filter identifiers according to the preset mapping rule. As an implementation, the filter identifiers arranged sequentially from top to bottom in the first list may be mapped, in the order of the filter identifiers, to filtered information corresponding to the filter identifiers arranged along a first direction in the second display area. For example, a first one of the filter identifiers arranged from top to bottom in the first list is mapped to filtered information corresponding to the first one of the filter identifiers arranged along the first direction in the second display area.

In this way, the order of the filter identifiers in the first list is adjusted, and thereby the order of the filtered information in the second display area is adjusted.

Optionally, the method for displaying information further includes: adjusting an order of sub-areas associated with a dragging operation, on reception of the dragging operation by a user on a sub-area within the second display area, where display positions of a filter identifier and information of a to-be-processed message corresponding to the filter identifier displayed in a sub-area being adjusted are adjusted synchronously with a display position of the sub-area.

In these optional implementations, the display positions of the filtered information may be adjusted by performing a dragging operation on sub areas in the second display area. Therefore, the convenience for the user to adjust the display positions of the filtered information is improved.

In some optional implementations of the method according to embodiments of the present disclosure, the method for displaying information further includes hiding the second display area in the display page, on reception of an instruction for ceasing display of filtered information.

In the optional implementations, a switch for displaying filtered information may be set on the filter identifier editing page. Based on a control operation on the switches, the filtered information is displayed or display of the filtered information is ceased. That is, a user can manually control the display of the filtered information. Therefore, user experience is improved.

Figure 4:
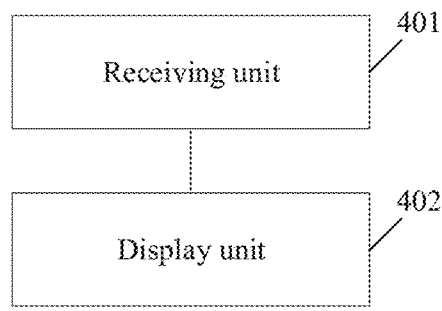
FIG. 4 is a structural schematic diagram of an apparatus for displaying information according to an embodiment of the present disclosure.

Reference is further made to FIG. 4. As a realization of the method shown in the above figures, an apparatus for displaying information is provided in an embodiment of the present disclosure. The apparatus embodiment corresponds to the method embodiment as shown in FIG. 1. The apparatus may be specifically applied to various electronic devices.

As shown in FIG. 4, the apparatus for displaying information in this embodiment includes a receiving unit 401 and a display unit 402. The receiving unit 401 is configured to receive an instruction for displaying a page for instant messaging. The display unit 402 is configured to displaying, in response to the instruction, a display page for the instant messaging. The display page includes a first display area and a second display area. Contact information is displayed in the first display area, and filtered information is displayed in the second display area. The contact information includes an identifier of at least one contact and interaction information with the contact. The filtered information includes a filter identifier and information of a to-be-processed message in messages corresponding to the filter identifier. A message corresponding to a filter identifier is obtained by performing filtering on messages to at least one contact under a preset filtering condition corresponding to the filter identifier. In other words, the display page for the instant messaging is displayed in response to the instruction. The display page includes the first display area and the second display area. The contact information is displayed in the first display area. The contact information includes an identifier of at least one contact and the interaction information with the contact. The filtered information is displayed in the second display area. The filtered information includes a filter identifier and quantity information of to-be-processed messages in a message corresponding to the filter identifier. The message corresponding to the filter identifier is obtained by performing filtering on messages to at least one contact under a preset filtering condition corresponding to the filter identifier.

In this embodiment, specific processing of the receiving unit 401 and the display unit 402 of the apparatus and technical effects thereof, may be referred to the relevant explanations of steps 101 and 102 in the embodiment corresponding to FIG. 1, and are not described in further detail here.

In some optional implementations, a new message corresponding to the filter identifier is obtained by performing real-time filtering on new messages to at least one contact under a preset filtering condition corresponding to the filter identifier.

In some optional implementations, the filter identifier includes at least one or a combination of two or more of the following: at least one first filter identifier, corresponding to a preset filtering condition that includes filtering messages based on a preset attribute type of the messages; at least one second filter identifier, corresponding to a preset filtering condition that includes filtering messages based on state information of the messages; and at least one third filter identifier, corresponding to a preset filtering condition that is determined based on a user filtering condition set by a user.

In some optional implementations, the apparatus further includes an association unit (not shown in the figure). The association unit is configured to determining whether a to-be-processed message not associated with the filter identifier exists before the display unit displays filtered information in the second display area; filter the to-be-processed message based on preset filter conditions corresponding to multiple filter identifiers, on determining that the to-be-processed message not associated with the filter identifier exists, and determine a target filter identifier corresponding to the to-be-processed message based on a filtering result; and associate the to-be-processed message with the target filter identifier.

In some optional implementations, a quantity of the target filter identifier is determined based on the filtering result.

In some optional implementations, the association unit is further configured to: determine, based on a preset attribute type of the to-be-processed message, a target first filter identifier corresponding to the to-be-processed message; and determine, based on state information corresponding to the to-be-processed message, a target second filter identifier corresponding to the to-be-processed message.

In some optional implementations, the first filter identifier includes at least one of first filter identifiers indicating a single chat, a group chat, a shared document, an information service, a problem feedback, a confidential session, and a topic discussion square, respectively.

In some optional implementations, the second filter identifier includes an unread filter identifier, and the association unit is further configured to associate the to-be-processed message with the unread filter identifier, on determining that the state information of the to-be-processed message is unread state information.

In some optional implementations, the first display area and the second display area are arranged in a second direction; the second display area includes multiple sub-areas arranged sequentially along a first direction, each of the sub-areas is for displaying filtered information corresponding to one filter identifier, and the first direction is perpendicular to the second direction; a width in the first direction of each sub-area corresponding to filtered information is positively correlated with a space occupied by information of a to-be-processed message corresponding to the filtered information.

In some optional implementations, the information of the to-be-processed message includes quantity information, and that a width in the first direction of each sub-area corresponding to filtered information is positively correlated with a space occupied by information of a to-be-processed message corresponding to the filtered information includes that: a width in the first direction of each sub-area corresponding to the filtered information is positively correlated with bits of a quantity represented by the quantity information of the to-be-processed message corresponding to the filtered information.

In some optional implementations, the display unit 402 is further configured to: display filtered information not displayed currently in a display manner corresponding to a first display operation for displaying filtered information not displayed currently, on reception of the first display operation performed in the second display area.

In some optional implementations, a non-displayed-information identifier indicating existence of filtered information not displayed currently is displayed in the second display area; and the display unit 302 is further configured to: display, in a display window above a window of the display page, the filtered information not displayed, on reception of a selection operation on the non-displayed-information identifier, where the display window above the window of the display page includes a pop-up window and a floating window.

In some optional implementations, the second display area and the first display area are arranged in a second direction, multiple sub-areas for displaying filtered information are arranged sequentially in a first direction within the second display area, and the first direction is perpendicular to the second direction. The display unit 402 is further configured to: display, in the second display area after extended through an expansion operation, at least one filtered information not displayed currently, on reception of the expansion operation for expanding the display page along the first direction or an opposite direction of the first direction.

In some optional implementations, the first display area and the second display area are arranged in a second direction, multiple sub-areas for displaying filtered information are arranged sequentially in a first direction within the second display area, and the first direction is perpendicular to the second direction. The display unit 402 is further configured to: slide sub-areas corresponding to multiple filtered information along an opposite direction of the first direction, on reception of a sliding operation by a user along the opposite direction of the first direction within the second display area, to display at least one filtered information not displayed currently; or slide sub-areas corresponding to multiple filtered information along the first direction, on reception of a sliding operation by a user along the first direction within the second display area, to display at least one filtered information not displayed currently.

In some optional implementations, the display unit 402 is further configured to: switch content displayed in the first display area to at least one first filtered message corresponding to a first target filter identifier, on reception of an instruction for displaying a message corresponding to the first target filter identifier.

In some optional implementations, the at least one first filtered message is divided into at least one group, and each group corresponds to a contact.

In some optional implementations, the display unit 402 is further configured to: switch the content displayed in the first display area to a second filtered message corresponding to a second target filter identifier indicated in a first switching operation for switching a filter identifier, on reception of the first switching operation while displaying a first filtered message corresponding to the first target filter identifier.

In some optional implementations, the first switching operation includes: a selection operation on the second target filter identifier, or a sliding operation along a first direction on the first display area displaying a first filtered message, or a sliding operation along an opposite direction of the first direction on the first display area displaying a first filtered message, where the first direction is perpendicular to a direction along which the first display area and the second display area are arranged.

In some optional implementations, the apparatus further includes a recording unit (not shown in the figure), and the first filtered message includes multiple first filtered messages. The recording unit is configured to: record an identifier of a last one of the first filtered messages displayed in the first display area at a time of the first switching operation, before displaying the second filtered information corresponding to the second target filter identifier indicated in the first switching operation.

In some optional implementations, the display unit 402 is further configured to: determine, based on the recorded identifier, a target first filtered message displayed in the first display area, on reception of a second switching operation for switching back to the first target filter identifier; and display, in the first display area, the target first filtered message.

In some optional implementations, the display unit 402 is further configured to: determine multiple target first filtered information displayed in the first display area, by taking a first filtered message corresponding to the identifier as a first piece of the target first filtered information.

In some optional implementations, the display unit 402 is further configured to update information of a to-be-processed message corresponding to a filter identifier, based on an increase or decrease of the to-be-processed message corresponding to the filter identifier.

In some optional implementations, the display unit 402 is further configured to: determine a processing quantity of to-be-processed messages processed this time, on detection of processing on at least one of the to-be-processed messages corresponding to the first target filter identifier; update, based on the processing quantity, information of the to-be-processed message corresponding to the first target filter identifier, and synchronously update information of a to-be-processed message corresponding to another filter identifier associated with the processed to-be-processed messages.

In some optional implementations, the display unit 402 is further configured to: determine whether a new message corresponding to the first target filter identifier is displayed in the first display area, on reception of the new message while displaying the at least one first filtered message corresponding to the first target filter identifier; update quantity information corresponding to the second target filter identifier, on determining that the new message is not displayed in the first display area, and synchronously update information of a to-be-processed message corresponding to another filter identifier associated with the new message.

In some optional implementations, the first display area and the second display area are arranged in a second direction, and the display unit 402 is further configured to: display filtered information in the second display area as fixed display information on the display page, on reception of a sliding operation on the display page along the second direction, where the second direction directs from the first display area towards the second display area.

In some optional implementations, the second display area is displayed above the first display area, and the second direction directs from a bottom of a display page towards a top of the display page. The display unit 402 is further configured to: display each filtered information as fixed display information at a top of the display page, on reception of the sliding operation on the display page along the second direction.

In some optional implementations, the first display area and the second display area are arranged in a second direction, and the display unit 402 is further configured to: display filtered information in the second display area as fixed display information on the display page, on reception of a sliding operation on the display page along a third direction, where the third direction directs from the second display area towards the first display area.

In some optional implementations, the display unit 402 is further configured to: display a filter identifier editing page, on reception of an instruction for editing a filter identifier, where the filter identifier editing page includes a first list, and the first list includes multiple selected filter identifiers; and move a target filter identifier in the first list to a position indicated by a moving operation, on reception of the moving operation by a user on the target filter identifier, where the position is for indicating whether to display the target filter identifier in the second display area, or indicating a display position of the target filter identifier in the second display area.

In some optional implementations, the display unit 402 is further configured to: adjust an order of filter identifiers displayed in the second display area, based on an order of filter identifiers in the first list after an adjustment through the moving operation.

In some optional implementations, the display unit 402 is further configured to: adjust an order of sub-areas associated with a dragging operation, on reception of the dragging operation by a user on a sub-area within the second display area, where display positions of a filter identifier and information of a to-be-processed message corresponding to the filter identifier displayed in a sub-area being adjusted are adjusted synchronously with a display position of the sub-area.

In some optional implementations, the display unit 402 is further configured to hide the second display area in the display page, on reception of an instruction for ceasing display of filtered information.

In some optional implementations, the display unit 402 is further configured to cease, in the first display area, display of a target to-be-processed message corresponding to the first target filter identifier, and clear the target to-be-processed message from a to-be-processed message corresponding to the first target filter identifier, on detection of processing on the target to-be-processed message corresponding to the first target filter identifier.

In some optional implementations, the display unit 402 is further configured to cease, based on a preset information switching operation, display of the target to-be-processed message in the first display area corresponding to the first target filter identifier, on detection of processing on the target to-be-processed message corresponding to the first target filter identifier.

In some optional implementations, the display unit 402 is further configured to: clear, based on a preset information switching operation, the target to-be-processed message from a to-be-processed message corresponding to the first target filter identifier. The preset information switching operation includes switching from displaying a message corresponding to another filter identifier to displaying a message corresponding to the first target filter identifier. In this case, the clearing, based on a preset information switching operation, the target to-be-processed message from a to-be-processed message corresponding to the first target filter identifier includes: determining whether a time period for displaying the message corresponding to the first target filter identifier after switching back to the message corresponding to the first target filter identifier is greater than a preset time threshold, on reception of the preset information switching operation; and clearing the target to-be-processed message from the to-be-processed message corresponding to the first target filter identifier, in a case of a positive determination result.

In some optional implementations, the first target filter identifier corresponds to a user list including multiple user identifiers, and the user identifiers includes a group user identifier; and the display unit 402 is further configured to: clear the group user identifier from the user list after a to-be-processed message corresponding to the group user identifier is cleared, on reception of information that a group corresponding to the group user identifier is dissolved, or information that a user leaves a group corresponding to the group user identifier. In some optional implementations, the display unit 402 is further configured to switch, in the first display area, a current display content to at least one to-be-processed message based on a preset switching rule of to-be-processed messages, on reception of a preset to-be-processed message display operation by a user on filtered information corresponding to the first target filter identifier, where the at least one first filtered message includes the to-be-processed message.

Figure 5:
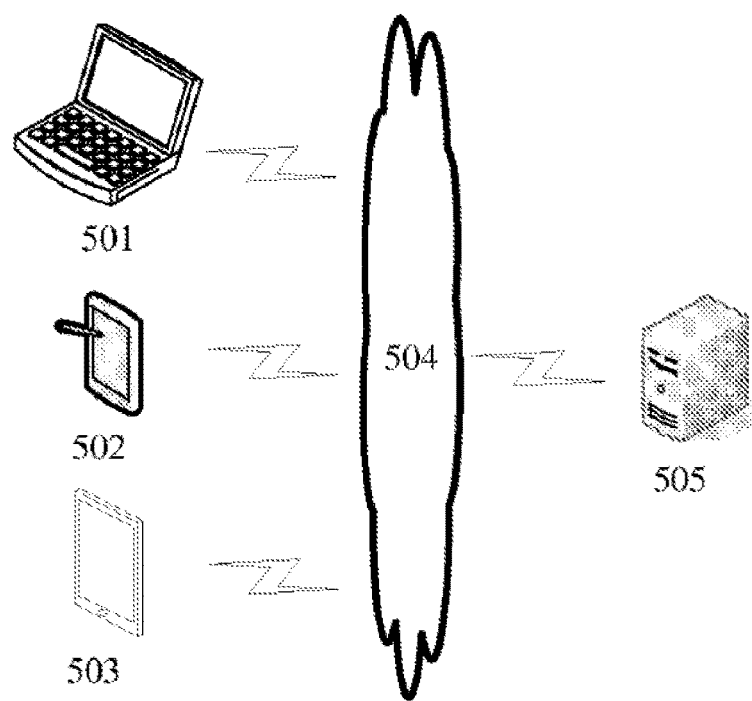
FIG. 5 is an exemplary system architecture to which a method for displaying information according to an embodiment of the present disclosure may be applied.

Reference is made to FIG. 5, which an exemplary system architecture to which a method for displaying information according to an embodiment of the present disclosure may be applied.

As shown in FIG. 5, the system architecture may include terminal devices 501, 502 and 503, a network 504 and a server 505. The network 504 is configured to provide medium of a communication link between the terminal devices 501, 502, 503 and the server 505. The network 504 may include various types of connections, such as wired, wireless communication links or optical fiber cable.

The terminal devices 501, 502 and 503 may interact with the server 505 over the network 504, to receive or transmit messages. The terminal devices 501, 502 and 503 may be installed with various clients, such as web browser application, search application and news application. Clients in the terminal devices 501, 502 and 503 may receive a user instruction, and perform function in response to the user instruction, such as adding information in information based on the user instruction.

The terminal devices 501, 502 and 503 may be implemented by hardware or software. In a case that the terminal devices 501, 502 and 503 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 501, 502 and 503 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 505 may provide various services. For example, the server 505 is configured to receive information transmitted from the terminal devices 501, 502 and 503, and forward the information to other terminal devices.

It should be noted that, the method for displaying information described in the embodiments of the present disclosure may be performed by the terminal device. Accordingly, the apparatus for displaying information may be arranged in the terminal devices 501, 502, and 503. In addition, the method for displaying information described in the embodiments of the present disclosure may be performed by the server 505. Accordingly, the apparatus for displaying information may be arranged in the server 505.

It should be understood that the numbers of the terminal devices, the network and the server in FIG. 5 are only schematic. Any number of terminal devices, networks and servers may be provided based on an actual need.

Figure 6:
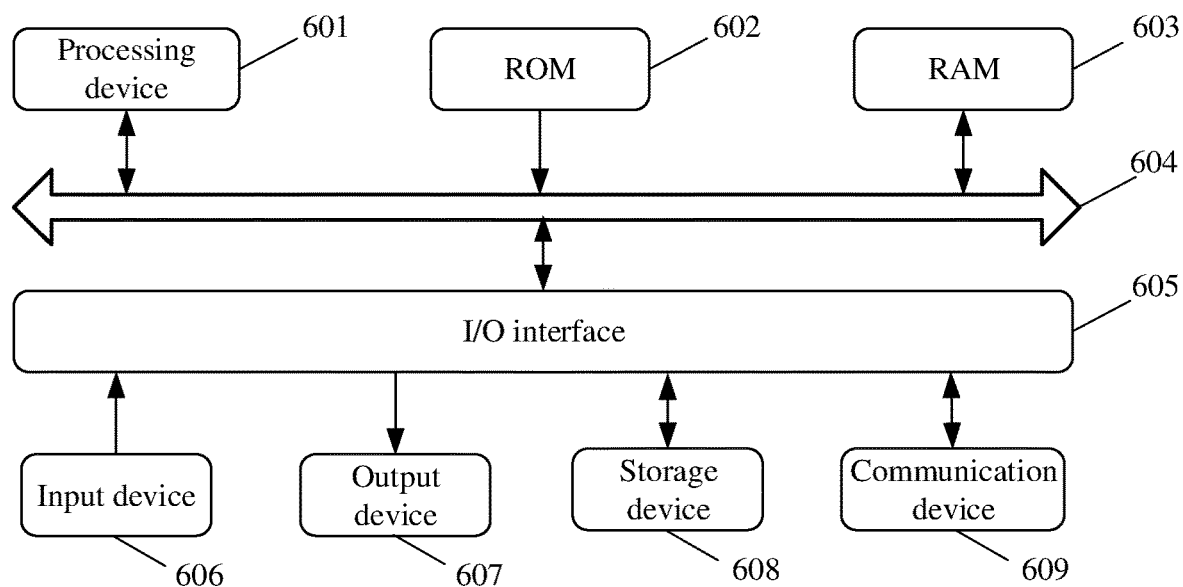
FIG. 6 is a schematic diagram of a basic structure of an electronic device according to an embodiment of the present disclosure.

Reference is made to FIG. 6, which shows a schematic structural diagram of an electronic device (for example a server shown in FIG. 5) for implementing the embodiment of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 6 is schematic, and is not intended to limit functions and scope of the embodiments of the present disclosure.

As shown in FIG. 6, the electronic device may include a processing apparatus (such as a central processor and a graphic processor) 601. The processing apparatus may perform various appropriate actions and processing by executing programs stored in a read-only memory (ROM) 602 or programs uploaded from a storage apparatus 608 to a random access memory (RAM) 603. Various programs and data required for operations of the electronic device are also stored in the RAM 603. The processing apparatus 601, the ROM 602 and the RAM 603 are connected to each other through the bus 604. An input/output (I/O) interface 605 is also connected to the bus 604.

Generally, the following components are connected to the I/O interface 605: an input device 606 such as a touch screen, a touch panel, a keyboard, a mouse, a camera, a microphone, an accelerometer, and gyroscope; an output device 607 such as a liquid crystal display (LCD), a loudspeaker and a vibrator; a storage device 608 such as a magnetic tape and a hard disk; and a communication device 609. The communication device 609 may allow the electronic device to communicate with other device in a wired or wireless manner to exchange data. Although FIG. 6 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 609, installed from the storage apparatus 608 or installed from the ROM 602. The computer program is executed by the processing apparatus 601 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable medium may be included in the electronic device described above, or may exist independently and is not installed in the electronic device.

The computer readable storage medium carries one or more programs. The one or more programs, when being executed by the electronic device, causes the electronic device to: receiving an instruction for displaying a page for instant messaging; display, in response to the instruction, a display page for the instant messaging, where the display page includes a first display area and a second display area; and display contact information in the first display area and display filtered information in the second display area, where the contact information includes an identifier of at least one contact and interaction information with the contact, the filtered information includes a filter identifier and information of a message corresponding to the filter identifier, and a message corresponding to a filter identifier is obtained by performing filtering on messages to at least one contact under a preset filtering condition corresponding to the filter identifier.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in an alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the module do not limit the module in a certain case.

The functions described above herein may be performed at least partially by one or more hardware logical components. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD) and the like.

In the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared, or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof The preferred embodiments and the technical principles of the present disclosure are described above. It should be understood by those skilled in the art that, the protection scope of the present disclosure is not limited to the technical solutions formed by specific combination of the above technical features, and other technical solutions formed by combinations of the above technical features or equivalent features without departing from the concept of the present disclosure also fall within the protection scope of the present disclosure. For example, the technical solution formed by replacement between the above technical features and technical features with similar functions disclosed (not limited) in the present disclosure also fall within the protection scope of the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementations of the claims.

The invention claimed is:

1. A method for displaying information, comprising:
    receiving an instruction for displaying a page for instant messaging;
    displaying, in response to the instruction, a display page for the instant messaging, wherein the display page comprises a first display area and a second display area; and
    displaying contact information in the first display area and displaying filtered information in the second display area, wherein the contact information comprises an identifier of at least one contact and interaction information with the contact, wherein
    the filtered information comprises a filter identifier, or, the filtered information comprises a filter identifier and information of a message corresponding to the filter identifier; and
    a message corresponding to a filter identifier is obtained by performing filtering on messages to at least one contact under a preset filtering condition corresponding to the filter identifier;
    the method further comprises:
    filtering a to-be-processed message based on preset filter condition corresponding to a filter identifier, the to-be-processed message is not associated with the filter identifier before the filtering;
    determining a target filter identifier corresponding to the to-be-processed message based on a filtering result; and
    associating the to-be-processed message with the target filter identifier.

2. The method according to claim 1, wherein a new message corresponding to the filter identifier is obtained by performing real-time filtering on new messages to at least one contact under a preset filtering condition corresponding to the filter identifier, or,
    wherein the filter identifier comprises at least one or a combination of two or more of the following:
    at least one first filter identifier, corresponding to a preset filtering condition that comprises filtering messages based on a preset attribute type of the messages;
    at least one second filter identifier, corresponding to a preset filtering condition that comprises filtering messages based on state information of the messages; and
    at least one third filter identifier, corresponding to a preset filtering condition that is determined based on a user filtering condition set by a user.

3. The method according to claim 1,
    wherein a quantity of the target filter identifier is determined based on the filtering result.

4. The method according to claim 1, wherein the filtering the to-be-processed message based on preset filter conditions corresponding to the filter identifier, and determining a target filter identifier corresponding to the to-be-processed message based on a filtering result, comprises:
- determining, based on a preset attribute type of the to-be-processed message, a target first filter identifier corresponding to the to-be-processed message; and
- determining, based on state information corresponding to the to-be-processed message, a target second filter identifier corresponding to the to-be-processed message; wherein
- a preset filtering condition corresponding to a first filter identifier comprises filtering the message based on a preset attribute type of the message, and
- a preset filtering condition corresponding to a second filter identifier comprises filtering based on state information of a message.

5. The method according to claim 1, wherein
a first filter identifier comprises at least one of first filter identifiers indicating a single chat, a group chat, a shared document, an information service, a problem feedback, a confidential session, and a topic discussion square, respectively; or
the message corresponding to the filter identifier comprises information of a to-be-processed message corresponding to the filter identifier.

6. The method according to claim 4, wherein the second filter identifier comprises an unread filter identifier, and
the determining, based on state information corresponding to the to-be-processed message, a target second filter identifier corresponding to the to-be-processed message comprises:
determining that the target second filter identifier corresponding to the to-be-processed message is an unread state filter identifier, on determining that the state information of the to-be-processed message is unread state information.

7. The method according to claim 1, wherein
the first display area and the second display area are arranged in a second direction;
the second display area comprises a plurality of sub-areas arranged sequentially along a first direction, each of the sub-areas is for displaying filtered information corresponding to one filter identifier, and the first direction is perpendicular to the second direction; and
a width in the first direction of each sub-area corresponding to filtered information is positively correlated with a space occupied by information of a to-be-processed message corresponding to the filtered information.

8. The method according to claim 7, wherein the information of the to-be-processed message comprises quantity information, and
that a width in the first direction of each sub-area corresponding to filtered information is positively correlated with a space occupied by information of a to-be-processed message corresponding to the filtered information comprises that:
a width in the first direction of each sub-area corresponding to the filtered information is positively correlated with bits of a quantity represented by the quantity information of the to-be-processed message corresponding to the filtered information.

9. The method according to claim 1, further comprising:
displaying filtered information not displayed currently in a display manner corresponding to a first display operation for displaying filtered information not displayed currently, on reception of the first display operation performed in the second display area, wherein a non-displayed-information identifier indicating existence of filtered information not displayed currently is displayed in the second display area; and
the displaying filtered information not displayed currently in a display manner corresponding to a first display operation for displaying filtered information not displayed currently, on reception of the first display operation performed in the second display area, comprises:
displaying, in a display window above a window of the display page, the filtered information not displayed, on reception of a selection operation on the non-displayed-information identifier, wherein
the display window above the window of the display page comprises a pop-up window or a floating window, or,
the first display area and the second display area are arranged in a second direction,
a plurality of sub-areas for displaying filtered information are arranged sequentially in a first direction within the second display area, and
the first direction is perpendicular to the second direction; and
the displaying filtered information not displayed currently in a display manner corresponding to a first display operation for displaying filtered information not displayed currently, on reception of the first display operation performed in the second display area comprises:
displaying, in the second display area after extended through an expansion operation, at least one filtered information not displayed currently, on reception of the expansion operation for expanding the display page along the first direction or an opposite direction of the first direction, or,
sliding sub-areas corresponding to a plurality of filtered information along an opposite direction of the first direction, on reception of a sliding operation by a user along the opposite direction of the first direction within the second display area, to display at least one filtered information not displayed currently; or
sliding sub-areas corresponding to a plurality of filtered information along the first direction, on reception of a sliding operation by a user along the first direction within the second display area, to display at least one filtered information not displayed currently.

10. The method according to claim 1, further comprising:
switching content displayed in the first display area to at least one first filtered message corresponding to a first target filter identifier, on reception of an instruction for displaying a message corresponding to the first target filter identifier.

11. The method according to claim 10, wherein the at least one first filtered message is divided into at least one group, and each group corresponds to a contact, or,
wherein the first target filter identifier corresponds to a user list comprising a plurality of user identifiers, and the user identifiers comprises a group user identifier; and
the method further comprises:
clearing the group user identifier from the user list after a to-be-processed message corresponding to the group user identifier is cleared, on reception of information that a group corresponding to the group user identifier is dissolved, or information that a user leaves a group corresponding to the group user identifier.

12. The method according to claim 10, further comprising:
switching the content displayed in the first display area to a second filtered message corresponding to a second target filter identifier indicated in a first switching operation for switching a filter identifier, on reception of the first switching operation while displaying a first filtered message corresponding to the first target filter identifier.

13. The method according to claim 12, wherein the first switching operation comprises:
a selection operation on the second target filter identifier, or
a sliding operation along a first direction on the first display area displaying a first filtered message, or a sliding operation along an opposite direction of the first direction on the first display area displaying a first filtered message, wherein
the first direction is perpendicular to a direction along which the first display area and the second display area are arranged.

14. The method according to claim 12, wherein
the first filtered message comprises a plurality of first filtered messages; and
the method further comprises:
recording an identifier of a last one of the first filtered messages displayed in the first display area at a time of the first switching operation, before displaying the second filtered information corresponding to the second target filter identifier indicated in the first switching operation;
determining, based on the recorded identifier, a target first filtered message displayed in the first display area, on reception of a second switching operation for switching back to the first target filter identifier; and
displaying, in the first display area, the target first filtered message.

15. The method according to claim 14, wherein the determining, based on the recorded identifier, a target first filtered message displayed in the first display area, on reception of a second switching operation for switching back to the first target filter identifier comprises:
determining a plurality of target first filtered information displayed in the first display area, by taking a first filtered message corresponding to the identifier as a first piece of the target first filtered information.

16. The method according to claim 10, further comprising:
updating information of a to-be-processed message corresponding to a filter identifier, based on an increase or decrease of the to-be-processed message corresponding to the filter identifier,
wherein the updating information of a to-be-processed message corresponding to a filter identifier, based on an increase or decrease of the to-be-processed message corresponding to the filter identifier comprises:
determining a processing quantity of to-be-processed messages processed this time, on detection of processing on at least one of the to-be-processed messages corresponding to the first target filter identifier;
updating, based on the processing quantity, information of the to-be-processed message corresponding to the first target filter identifier, and
synchronously updating information of a to-be-processed message corresponding to another filter identifier associated with the processed to-be-processed messages, or,
wherein the updating information of a to-be-processed message corresponding to a filter identifier, based on an increase or decrease of the to-be-processed message corresponding to the filter identifier comprises:

determining whether a new message corresponding to the first target filter identifier is displayed in the first display area, on reception of the new message while displaying the at least one first filtered message corresponding to the first target filter identifier;
updating quantity information corresponding to the second target filter identifier, on determining that the new message is not displayed in the first display area, and
synchronously updating information of a to-be-processed message corresponding to another filter identifier associated with the new message.

17. The method according to claim 1, wherein
the first display area and the second display area are arranged in a second direction, and
the method further comprises:
displaying filtered information in the second display area as fixed display information on the display page, on reception of a sliding operation on the display page along the second direction, wherein
the second direction directs from the first display area towards the second display area,
wherein
the second display area is displayed above the first display area,
the second direction directs from a bottom of a display page towards a top of the display page, and
the displaying filtered information in the second display area as fixed display information on the display page, on reception of a sliding operation on the display page along the second direction comprises:
displaying each filtered information as fixed display information at a top of the display page, on reception of the sliding operation on the display page along the second direction.

18. The method according to claim 1, wherein
the first display area and the second display area are arranged in a second direction, and
the method further comprises:
displaying filtered information in the second display area as fixed display information on the display page, on reception of a sliding operation on the display page along a third direction, wherein the third direction directs from the second display area towards the first display area, or,
wherein the method further comprising:
hiding the second display area in the display page, on reception of an instruction for ceasing display of filtered information.

19. The method according to claim 1, further comprising:
displaying a filter identifier editing page, on reception of an instruction for editing a filter identifier, wherein the filter identifier editing page comprises a first list, and the first list comprises a plurality of selected filter identifiers; and
moving a target filter identifier in the first list to a position indicated by a moving operation, on reception of the moving operation by a user on the target filter identifier, wherein
the position is for indicating whether to display the target filter identifier in the second display area, or indicating a display position of the target filter identifier in the second display area;
or, further comprising:
adjusting an order of filter identifiers displayed in the second display area, based on an order of filter identifiers in the first list after an adjustment through the moving operation, or, adjusting an order of sub-areas associated with a dragging operation, on reception of the dragging operation by a user on a sub-area within the second display area, wherein, display positions of a filter identifier and information of a to-be-processed message corresponding to the filter identifier displayed in a sub-area being adjusted are adjusted synchronously with a display position of the sub-area.

20. The method according to claim 10, further comprising:
ceasing, in the first display area, display of a target to-be-processed message corresponding to the first target filter identifier, and clearing the target to-be-processed message from a to-be-processed message corresponding to the first target filter identifier, on detection of processing on the target to-be-processed message corresponding to the first target filter identifier.

21. The method according to claim 10, further comprising:
ceasing, based on a preset information switching operation, display of the target to-be-processed message in the first display area corresponding to the first target filter identifier, on detection of processing on the target to-be-processed message corresponding to the first target filter identifier.

22. The method according to claim 20, wherein
the first target filter identifier is a second filter identifier corresponding to a preset filtering condition that comprises filtering based on state information of a message.

23. The method according to claim 21,
wherein the preset information switching operation comprises one of the following:
a switching operation for switching to displaying a message corresponding to another filter identifiers, while displaying the message corresponding to the first target filter identifier; and
an operation for switching back to displaying the message corresponding to the first target filter identifier, while displaying a message corresponding to another filter identifier;
or, the method further comprising:
clearing, based on a preset information switching operation, the target to-be-processed message from a plurality of to-be-processed messages corresponding to the first target filter identifier; wherein
the preset information switching operation comprises switching from displaying a message corresponding to another filter identifier to displaying a message corresponding to the first target filter identifier, and
the clearing, based on a preset information switching operation, the target to-be-processed message from a plurality of to-be-processed messages corresponding to the first target filter identifier comprises:
determining whether a time period for displaying the message corresponding to the first target filter identifier after switching back to the message corresponding to the first target filter identifier is greater than a preset time threshold, on reception of the preset information switching operation; and
clearing the target to-be-processed message from the plurality of to-be-processed messages corresponding to the first target filter identifier, in a case of a positive determination result.

24. The method according to claim 10, wherein the switching content displayed in the first display area to at least one first filtered message corresponding to a first target filter identifier, on reception of an instruction for displaying a message corresponding to the first target filter identifier comprises:
switching, in the first display area, a current display content to at least one to-be-processed message based on a preset switching rule of to-be-processed messages, on reception of a preset to-be-processed message display operation by a user on filtered information corresponding to the first target filter identifier, wherein
the at least one first filtered message comprises the to-be-processed message.

25. An electronic apparatus, comprising:
at least one processor; and
at least one memory communicatively coupled to the at least one processor and storing instructions that upon execution by the at least one processor cause the apparatus to:
receive an instruction for displaying a page for instant messaging;
display, in response to the instruction, a display page for the instant messaging, wherein the display page comprises a first display area and a second display area; and
display contact information in the first display area and displaying filtered information in the second display area, wherein the contact information comprises an identifier of at least one contact and interaction information with the contact, wherein
the filtered information comprises a filter identifier, or, the filtered information comprises a filter identifier and information of a message corresponding to the filter identifier;
a message corresponding to a filter identifier is obtained by performing filtering on messages to at least one contact under a preset filtering condition corresponding to the filter identifier, and
wherein the instructions, upon execution by the at least one processor, further cause the apparatus to:
filter a to-be-processed message based on preset filter condition corresponding to a filter identifier, the to-be-processed message is not associated with the filter identifier before the filtering;
determine a target filter identifier corresponding to the to-be-processed message based on a filtering result; and
associate the to-be-processed message with the target filter identifier.

* * * * *